United States Patent
Lin

(10) Patent No.: US 8,459,791 B2
(45) Date of Patent: Jun. 11, 2013

(54) SPECTACLE FRAME FOR PROTECTIVE SHIELD

(75) Inventor: Yung-Chin Lin, Chung Li (TW)

(73) Assignee: Suncute Industries Co., Ltd., Taoyuan Hsien (TW)

( * ) Notice: Subject to any disclaimer, the term of this patent is extended or adjusted under 35 U.S.C. 154(b) by 64 days.

(21) Appl. No.: 13/151,250

(22) Filed: Jun. 1, 2011

(65) Prior Publication Data
US 2012/0307196 A1 Dec. 6, 2012

(51) Int. Cl.
*G02C 5/00* (2006.01)
(52) U.S. Cl.
CPC ..................................... *G02C 5/00* (2013.01)
USPC ................................ 351/41; 351/83; 351/111
(58) Field of Classification Search
CPC ........................................................... G02C 5/00
USPC ............. 351/41, 43, 103–109, 111–123, 158; 2/209.13
See application file for complete search history.

(56) References Cited

U.S. PATENT DOCUMENTS
2,301,325 A * 11/1942 Reiss et al. ................... 351/109

FOREIGN PATENT DOCUMENTS
JP 6-123854 * 5/1994 ................... 351/114

* cited by examiner

*Primary Examiner* — Huy K Mai
(74) *Attorney, Agent, or Firm* — Leong C. Lei

(57) ABSTRACT

A spectacle frame comprises a substantially straight or slightly curved structure composed of two rims and a bridge, and two temples. The bridge is connected between the two rims. One end of each temple is rotatably connected with an outward portion of a respective rim via a hinge. Each temple is formed into a bow-shaped bar that has a front portion, a middle portion, and a rear portion. The spectacle frame is designed to have a predetermined first parameter, a predetermined second parameter, a predetermined third parameter, and a predetermined fourth parameter, whereby the spectacle frame has a size smaller than general glasses to facilitate a person engaging a special task to wear a protective shield and prevent the protective shield from being interfered with, and can perfectly fit various facial profiles of persons so as to keep the protective shield airtight.

2 Claims, 4 Drawing Sheets

SPECTACLE FRAME FOR PROTECTIVE SHIELD

TECHNICAL FIELD OF THE INVENTION

The present invention relates to a spectacle frame and, more particularly, to a spectacle frame for persons engaging in special tasks to facilitate the wearing of protective shields.

DESCRIPTION OF THE PRIOR ART

Generally, a spectacle frame is provided with two hinge portions each mounted at an outward portion of a rim for rotatably mounting a temple such that each temple can be rotated to a folded or unfolded position.

However, such spectacle frame has relatively large structure of rims and thus cannot perfectly fit a user's face. Thus, shortsighted persons engaging in special tasks, such as fire fighting or mine works, required for wearing protective shields, should fix their glasses before wearing protective shields to prevent the glasses from movement. Even more, the glasses may interfere with the wearing of a protective shield. Therefore, some persons may select to wear contact lenses. However, not everyone is suitable to wear contact lenses. In special tasks, such as fire fighting or disaster relieves, the conventional glasses may interfere with an operation, there is a requirement to design an improved spectacle frame in cooperation with protective shields for those engaging in special tasks.

SUMMARY OF THE INVENTION

The primary object of the invention is to provide a spectacle frame for use with a protective shield. The spectacle frame can perfectly fit a person engaging in a special task required for wearing a protective shield, in which the spectacle frame fits various facial profiles and does not interfere with the protective shield so as to keep the protective shield airtight.

To achieve the object of the invention, an improved spectacle frame is disclosed, which generally comprises a substantially straight or slightly curved main structure composed of two rims and a bridge, and two temples, wherein the bridge is connected between the two rims, one end of each temple is rotatably connected with an outward portion of a respective rim via a hinge. Each temple is formed into a bow-shaped bar that has a front portion adjacent to a respective rim, a rear portion for engaging with a user's ear, and a middle portion between the front portion and the rear portion, wherein, when the temples are in fully extended state, the front portion is extended outwardly whereas the middle portion is extended inwardly. The spectacle frame is designed to have a predetermined first parameter, a predetermined second parameter, a predetermined third parameter, and a predetermined fourth parameter, wherein the predetermined first parameter is defined as the distance between the two hinges, the predetermined first parameter being approximately set from 112 to 122 mm; the predetermined second parameter is defined as the distance between the bridge and a position at which the front portion and the middle portion are joined, along a direction perpendicular to the main structure when the temples are fully extended, the predetermined second parameter being approximately set from 38 to 48 mm; the predetermined third parameter is defined as the length of the middle portion, the predetermined third parameter being approximately set greater than 30 mm; the predetermined fourth parameter is defined as the angle between the main structure and the front portion of either of the temples in fully extended state, the predetermined fourth parameter being approximately set from 68 to 80 degrees; whereby the spectacle frame can be compactly and snugly fitted on a user's face.

Furthermore, the middle portion of each temple has a thickness less 0.4 mm, to facilitate the temples to be snugly contacted with two sides of a user's face.

The present invention can bring several beneficial effects: the spectacle frame has a smaller size to facilitate a user in wearing a protective shield and prevent the protective shield from being interfered with; the spectacle frame can perfectly fit various facial profiles to keep the protective shield airtight.

Other objects, advantages, and novel features of the present invention will become more apparent from the following detailed description when taken in conjunction with the accompanying drawings.

DETAILED DESCRIPTION OF THE PREFERRED EMBODIMENTS

Detailed description for the invention will proceed in the following paragraphs with accompanying drawings.

Figure 1:
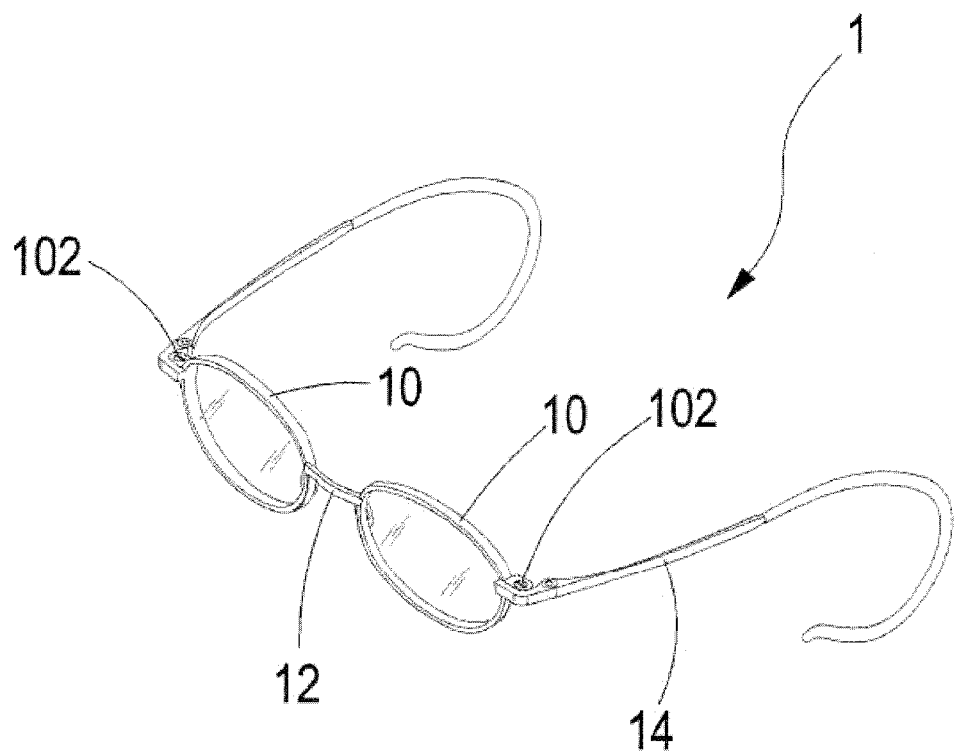
FIG. 1 is a 3-dimensional view showing a spectacle frame for use with a protective shield according to the present invention.
Figure 2:
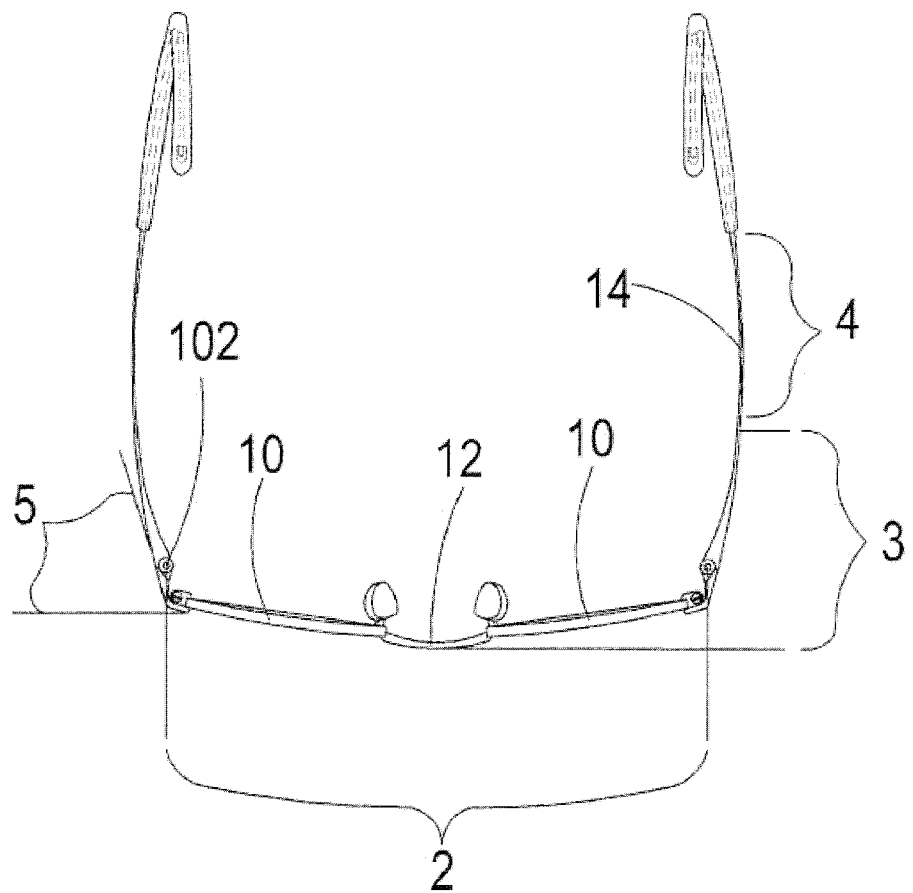
FIG. 2 is a bottom view showing various featured parameters of the spectacle frame according to the present invention.

FIGS. 1 and 2 respectively show a 3-dimensional view and a schematic view showing the various featured parameters of a spectacle frame according to the present invention. As shown, the spectacle frame 1 generally comprises a substantially straight or slightly curved main structure composed of two rims 10 and a bridge 12, and two temples 14, wherein the bridge 12 is connected between the two rims 10, one end of each temple 14 is rotatably connected with an outward portion of a respective rim 10 via a hinge 102. Each temple 14 is formed into a bow-shaped bar that has a front portion adjacent to a respective rim 10, a rear portion for engaging with a user's ear, and a middle portion between the front portion and the rear portion, wherein, when the temples 14 are in fully extended state, the front portion is extended outwardly whereas the middle portion is extended inwardly (see FIG. 2). The spectacle frame 1 is designed and featured to have a predetermined first parameter 2, a predetermined second parameter 3, a predetermined third parameter 4, and a predetermined fourth parameter 5, as shown in FIG. 2, wherein the predetermined first parameter 2 is defined as the distance between the two hinges 102, the predetermined second parameter 3 is defined as the distance between the bridge 12 and a position at which the front portion and the middle portion are joined, along a direction perpendicular to the main structure when the temples 14 are fully extended, the third parameter 4 is defined as the length of the middle portion, and the predetermined fourth parameter 5 is defined as the angle between the main structure and the front portion of either of the temples 14 in fully extended state.

As shown in FIG. 2, the predetermined first parameter, indicated at numeral 2, is approximately set from 112 to 122 mm; the predetermined second parameter, indicated at numeral 3, is approximately set from 38 to 48 mm; the predetermined third parameter, indicated at numeral 4, is approximately set greater than 30 mm; the predetermined fourth parameter 4, indicated at numeral 5, is approximately set from 68 to 80 degrees; preferably, the middle portion of each temple 14 has a thickness less 0.4 mm.

Figure 3:
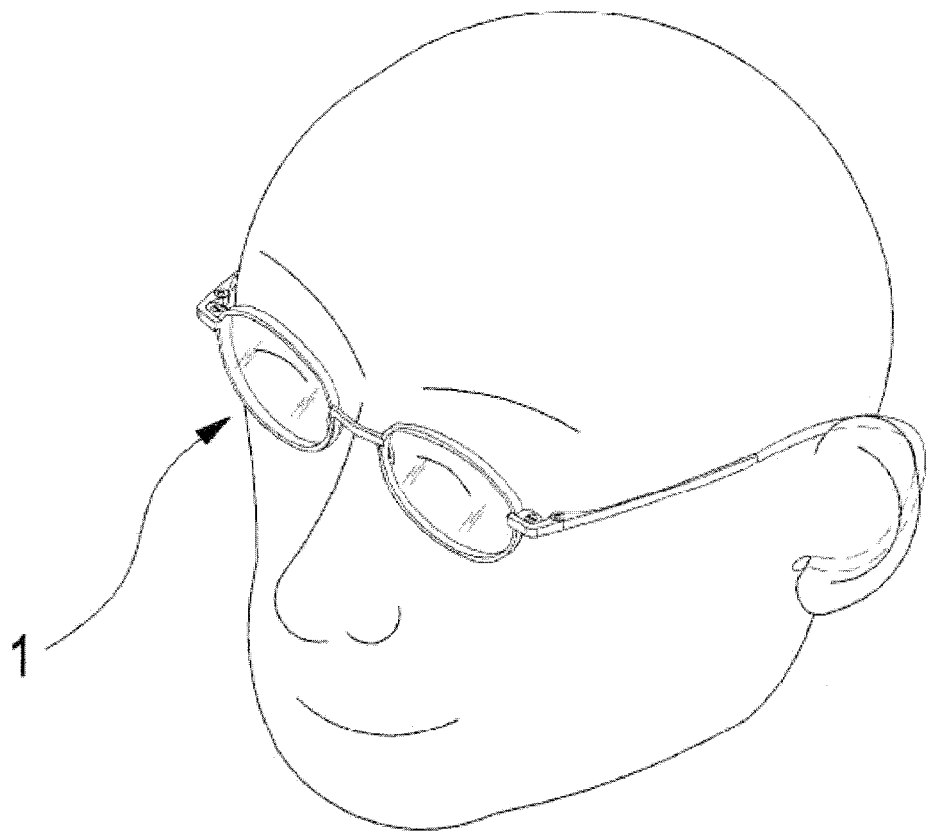
FIG. 3 is a schematic view showing a user wears the spectacle frame of the present invention.
Figure 4:
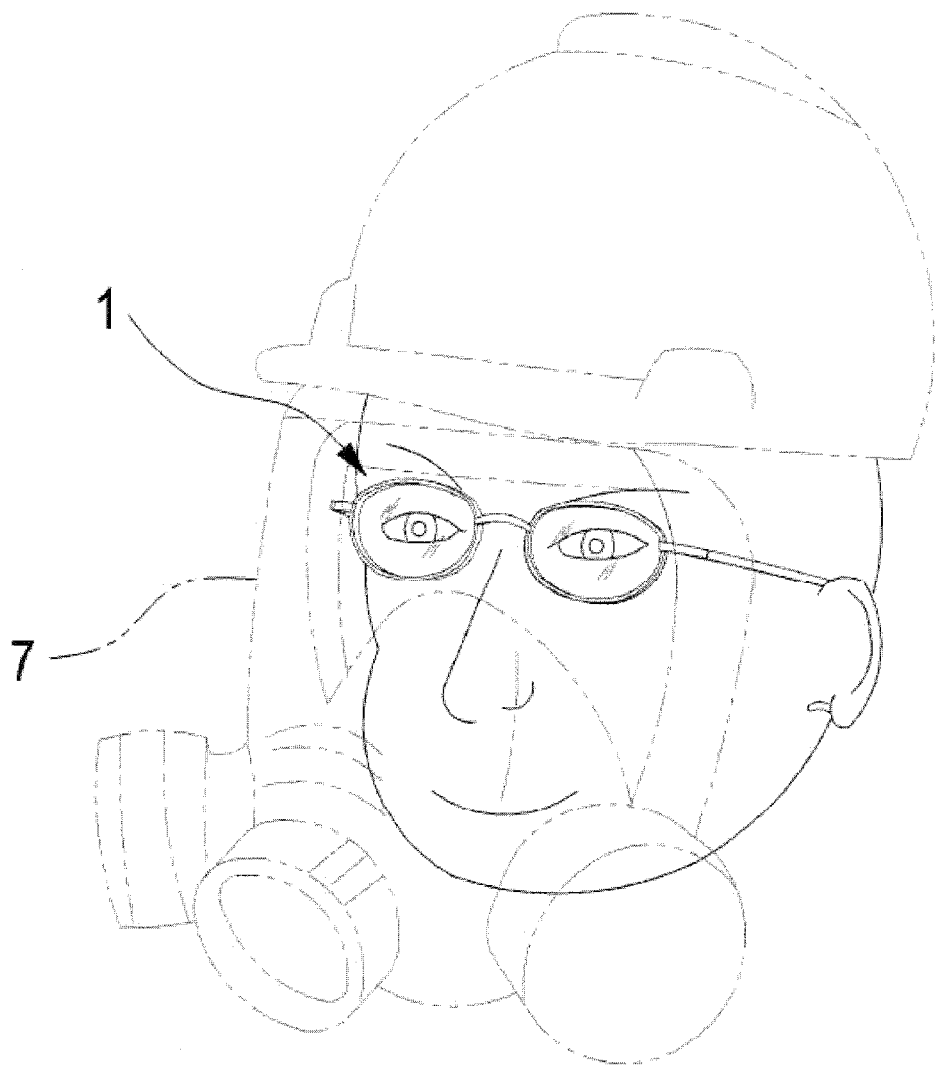
FIG. 4 is another schematic view showing a user wears the spectacle frame of the present invention in cooperation with a protective shield.

FIGS. 3 and 4 are schematic views showing an exemplary application of the present invention. Based on the predetermined first, second, third, and fourth parameters of the present invention, the spectacle frame 1 can perfectly fit a user, wherein the predetermined first parameter 2, being approximately set from 112 to 122 mm, allows the spectacle frame 1 to closely fit on the face of a user; the predetermined second parameter 3, being approximately set from 38 to 48 mm, allows the spectacle frame 1 to snugly fit on two sides of the face of a user; the predetermined third parameter 4, being approximately set greater than 30 mm, with a temple thickness, particularly at the middle portion, less than 0.4 mm allows the temples 14 of the spectacle frame 1 to further snugly contact with two sides of the face of a user; the predetermined fourth parameter 5, being approximately set from 68 to 80 degrees, prevents the spectacle frame from being oversized or undersized when wearing the spectacle frame; whereby the spectacle frame can be compactly and snugly fitted on a user's face.

As shown in FIG. 4, after the spectacle frame 1 has been worn, a protective shield 7 can be worn in cooperation with the spectacle frame to perform a special task. The spectacle frame 1 will not interfere with the protective shield 7.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A spectacle frame for use with a protective shield, said spectacle frame including a substantially straight or slightly curved main structure composed of two rims and a bridge, and two temples, said bridge connected between said two rims, one end of each temple connected with an outward portion of a respective rim via a hinge, said spectacle frame being characterized in that:

each said temple is formed into a bow-shaped bar that has a front portion adjacent to a respective rim, a rear portion for engaging with a user's ear, and a middle portion between the front portion and the rear portion, wherein, when said temples are in fully extended state, the front portion is extended outwardly whereas the middle portion is extended inwardly; said spectacle frame is designed to have a predetermined first parameter, a predetermined second parameter, a predetermined third parameter, and a predetermined fourth parameter, wherein the predetermined first parameter is defined as the distance between said two hinges and is approximately set from 112 to 122 mm the predetermined second parameter is defined as the distance between said bridge and a position at which the front portion and the middle portion are joined, along a direction perpendicular to the main structure when said temples are fully extended, the predetermined second parameter being approximately set from 38 to 48 mm, the predetermined third parameter is defined as the length of the middle portion and is approximately set greater than 30 mm, and the predetermined fourth parameter is defined as the angle between the main structure and the front portion of either of said temples in fully extended state, the predetermined fourth parameter being approximately set from 68 to 80 degrees; whereby said spectacle frame can be compactly and snugly fitted on a user's face.

2. A spectacle frame for use with a protective shield as claimed in claim 1, wherein the middle portion of each said temple has a thickness less 0.4 mm.

\* \* \* \* \*